United States Patent [19]
Pearson

[11] 3,850,801
[45] Nov. 26, 1974

[54] WASTE WATER PURIFICATION SYSTEM

[75] Inventor: Philip J. Pearson, Milwaukee, Wis.

[73] Assignee: McQuay-Perfex Inc., Minneapolls, Minn.

[22] Filed: June 7, 1973

[21] Appl. No.: 367,716

[52] U.S. Cl............ 210/86, 210/104, 210/113, 210/143, 210/151, 210/170, 210/179, 210/181, 210/195, 210/197, 210/199
[51] Int. Cl............ C02b 3/04, C02c 1/04
[58] Field of Search...... 165/66; 210/11, 12, 14–17, 210/63, 64, 71, 85, 86, 104, 113, 149, 151, 152, 170, 179, 181, 195, 197, 199, 262, 523, 526, 532, 532 S, 150, 4–8, 143

[56] References Cited
UNITED STATES PATENTS

| | | | |
|---|---|---|---|
| 1,470,145 | 10/1923 | Caron et al. | 165/66 X |
| 2,150,226 | 3/1939 | Kennedy | 210/113 X |
| 2,466,241 | 9/1969 | Simpson | 210/17 |
| 2,938,630 | 5/1960 | Novak | 210/64 X |
| 3,025,962 | 3/1962 | Williams | 210/86 |
| 3,296,122 | 1/1967 | Karassik et al. | 210/15 X |
| 3,306,447 | 2/1967 | Medeiros | 210/170 X |
| 3,487,937 | 1/1970 | Koulovatos | 210/195 |
| 3,563,888 | 2/1971 | Klock | 210/150 X |
| 3,575,849 | 4/1971 | Torpey | 210/14 |
| 3,576,251 | 4/1971 | Clyne | 210/526 X |
| 3,679,053 | 7/1972 | Koulovatos et al. | 210/86 |

Primary Examiner—Charles N. Hart
Assistant Examiner—Robert H. Spitzer

[57] ABSTRACT

A highly efficient and compact biological waste treatment system for use in conjunction with an anaerobic holding tank to provide a high degree of purification for use in areas where municipal sewer systems are unavailable. A pump conveys anaerobically treated sewage from the septic tank to a biological oxidation tank which employs a plurality of partially submerged discs providing a surface for the growth of bacterial slimes. A motor rotates the discs so that the bacteria can oxidize the sewage thereby removing substantially all of the biochemical oxygen demand. After dropping to a settling tank, from the bottom of which sludge is returned to the septic tank, the clarified supernatant is passed through a filter to a high efficiency sterilizer which utilizes a heat exchanger. An artificial feed system is provided to supply nutrients to keep bacteria in the biological oxidation tank alive during extended periods of nonuse of the system.

19 Claims, 6 Drawing Figures

WASTE WATER PURIFICATION SYSTEM

BACKGROUND OF THE INVENTION

The present invention pertains generally to the field of biological waste treatment systems, and more particularly to the field of waste water treatment systems for use in single family dwellings and the like.

In rural areas and in suburban areas in which municipal sewage facilities are not yet available, the most widely used method of waste treatment is the septic tank. However, for a variety of reasons, septic tank treatment alone is not satisfactory. If the septic tanks are poorly designed, or are used in the wrong kind of soil, the capacity of the soil to purify the output from the septic tank may easily be exceeded. Even under favorable soil conditions, the same problems can arise when too many septic tanks are placed too close together, such as can happen when a number of cabins are built close together around the lake. Serious consequences may result when septic tank treatment systems are inadequate. The back-up of sewage into the home may result, or there may be seepage of raw sewage over the ground surface. An increasingly serious problem is the contamination of water supplies, due to inadequately treated sewage entering lakes or rivers. For example, a serious situation can occur where too many cabins are built around a lake, each cabin having a septic tank. Frequently there is only a thin layer of soil on top of relatively nonporous bedrock. The effluent from the septic tanks seeps through the soil over the rock and down into the ground water to the lake before the bacteria in the soil have had time to oxidize and purify the waste water. The result is that the lake water becomes contaminated with intestinal bacteria from the sewage, some of which may be pathogenic. Since the lake water may be used for the drinking water supply, either at the lake or downstream from a river fed by the lake, a danger of disease is created, necessitating costly water treatment plants.

Another undesirable effect resulting from the run-off of improperly treated sewage into lakes and rivers is the fact that such sewage contains a very high biochemical oxygen demand, which results in the depletion of dissolved oxygen from the water, killing fish and other aquatic life forms, as well as providing nutrients for the growth of algaes. Since an adequate water supply is becoming increasingly critical, pollution of a source of supply through the discharge of inadequately treated sewage cannot be condoned.

Accordingly, the present invention provides a compact highly efficient lightweight waste water treatment system suitable for use in single family dwellings. The present invention provides three phases of waste water treatment. The first phase takes place in a primary holding tank which may be an existing septic tank. A series of baffles within the tank retain the floating material while the heavier solids settle to the bottom and undergo anaerobic decomposition. The second phase of treatment consists of biological oxidation, which takes place in a special tank having a number of partially submerged lightweight discs supported on a horizontal shaft near the surface of the waste water. The discs are slowly rotated by a motor so that bacterial slimes growing on the discs are alternately supplied with nutrients from the waste water and oxygen from the air. The bacteria oxidize the organic matter to stable forms. The third phase of purification comprises disinfection by heating the clarified effluent in a sterilizer tank. The final effluent from this system is substantially free of pathogenic bacteria, and has had substantially all its biochemical oxygen demand removed. The treated effluent may then discharge into a leach field, or, since it is so highly treated, it may be recirculated for use in the home other than for drinking or hygenic purposes. For example, treated effluent may be used for toilet flushing or lawn sprinkling, thereby reducing the demands on the water supply and soil absorption field capacities.

Controls are included on the unit to sense malfunctions and to give a warning signal to the home owner, should they occur. Means are also provided for shutting down the system during extended periods of nonuse, for example, when installed in a non-year around summer home. An auxillary feeding system is provided to supply chemical nutrients to the bacteria in the biological oxidation section so that the bacteria will remain alive and active during shorter periods of nonuse, such as when the home owner goes on vacation. Thus the system is ready for immediate reactivation when the period of nonuse is over, thereby assuring that no untreated waste water ever leaves the system.

SUMMARY OF THE INVENTION

According to the present invention there is provided a waste water treatment system for use in conjunction with an anaerobic holding tank, including a disc type aerobic oxidation tank, means for pumping anaerobically treated material from the holding tank to the oxidation tank, a clarifier, and a sterilizer for disinfecting the clarified effluent.

DESCRIPTION OF THE PREFERRED EMBODIMENT

Figure 1:
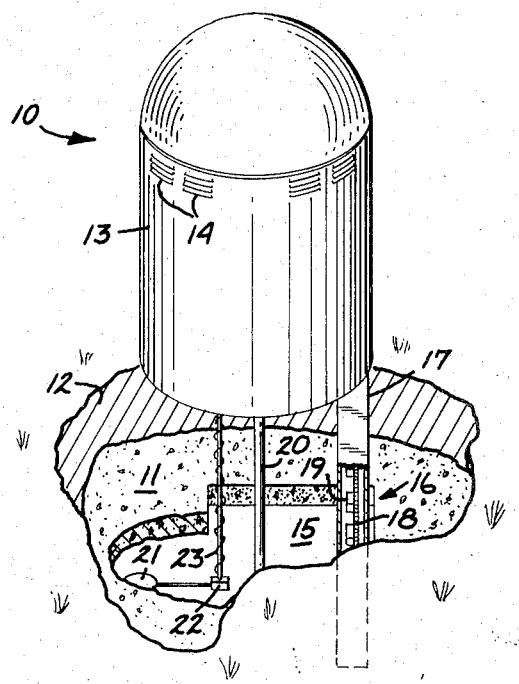
FIG. 1 is a front elevation view of a waste water purification system according to the present invention.

In FIG. 1, reference numeral 10 generally designates a waste water purification system adapted to be used in conjunction with a conventional septic tank 11 buried under the soil 12. The unit 10 has a housing 13 which is positioned above ground over the access opening 15 of septic tank 11. Housing 13 has vents 14 to provide air for the biological oxidation process, which is explained more fully in a subsequent paragraph. A bucket pump assembly 16 which comprises shroud cylinder 17, a chain 18, and a plurality of buckets 19, extends through access opening 15 down into the septic tank to the rest of the treatment unit. A return pipe 20 is provided for returning sludge from the treatment unit to the septic tank. A float 21 and switch assembly 22 are supported by a member 23 in the septic tank. These elements comprise a level control probe for sensing the level of waste water in the septic tank.

Figure 2:
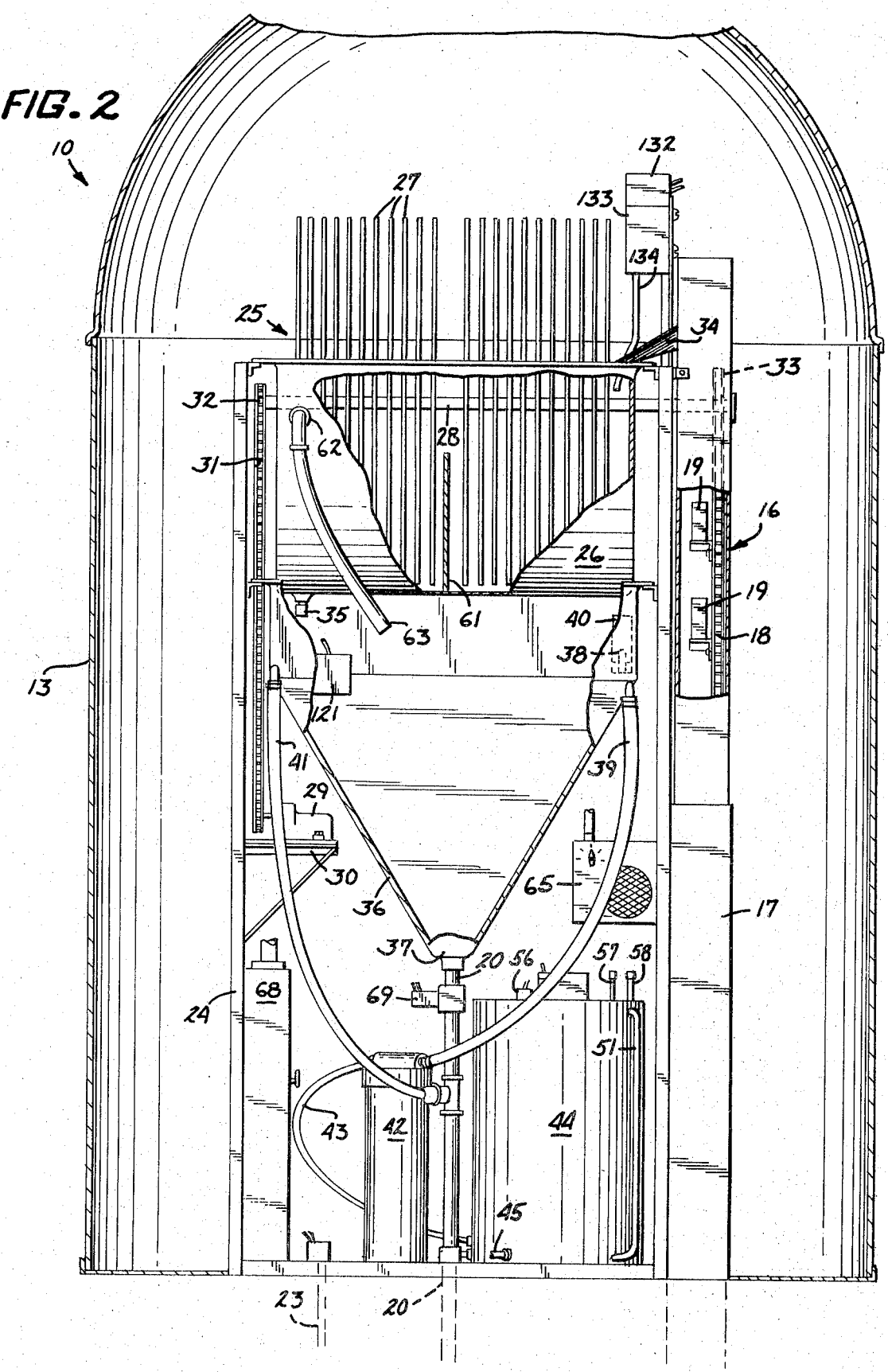
FIG. 2 is a diagrammatic cross-section showing the inner details of the unit of FIG. 1.

In FIG. 2, the waste water purification system 10 of FIG. 1 is shown in more detail. Housing 13 is cut away to show the functional elements of the unit. A frame 24 is provided for supporting the various components of the treatment unit. Attached to frame 24 near the top thereof is a biological oxidation tank assembly 25. This assembly includes a tank 26, which is cut away in FIG. 2 to show a plurality of discs 27 which are disposed with tank 26, and also a baffle 61 which is attached to the lower portion of the tank, and which serves to substantially divide the tank into two portions. The discs are attached to a generally horizontal shaft 28, and are arranged in two groups, one on either side of baffle 61. Shaft 28 is mounted for rotation within tank 26 by suitable bearings (not shown). Shaft 28 is driven by a motor 29 which is mounted to frame 24 by a bracket 30, and which drives shaft 28 through a chain 31 which engages a sprocket 32 on the end of shaft 28. Of course, it will be understood that other mounting and drive arrangements for the motor could also be used.

Another sprocket 33 attached to the other end of shaft 28 engages chain 18 to which is attached buckets 19, comprising the bucket pump 16. The bucket pump is surrounded by cylinder 17 which extends downward into the septic tank as shown in FIG. 1. Cylinder 17 is used as a baffle to keep floating materials from being conveyed to the disc section. When motor 29 is operating, shaft 28 rotates together with discs 27 attached thereto, and bucket pump 16 is put into operation. Individual buckets 19 fill with waste water from the septic tank, and dump their contents into spout 34 at the top of the pump assembly. The waste water travels down spout 34 into tank 26. Rotation of discs 27 provides the biological oxidation, as will be described later.

A waste water outlet fitting 62 is provided in the side of tank 26, at about the level of shaft 28. A rubber hose 63, or other conduit, is attached to outlet fitting 62, so that waste water draining through outlet fitting 62 is directed by hose 63 to the clarifier tank 36, which is mounted to frame 24 directly beneath the biological oxidation tank assembly 25. Alternatively, tank 36 may be offset toward the side of the frame, so that the overall profile of the unit may be lowered. An outlet spout 35 is also provided at the bottom of tank 26, but this spout is normally capped off and is used only for draining of the tank, during extended periods of nonuse, for example at the end of the season, when installed in summer homes.

Clarifier tank 36 has a tapered lower portion which tapers toward an apex 37. Attached to the apex is return pipe 20 which extends downwardly into the septic tank as shown in FIG. 1. An electrically controlled dump valve 69 is connected in return pipe 20 for controlling the dumping of accumulated sludge from the bottom of the clarifier tank to the septic tank. While the accumulated sludge collects at the bottom of clarifier tank 36, the clarified supernatant moves to the top of the tank where it pours from a standpipe 38 which connects to tube 39. A cylinder 40, open at both ends, surrounds standpipe 38 and prevents any floating materials from clogging the entrance to the pipe. Instead of standpipe 38, a weir could be provided in the side of the clarifier tank. Another tube 41 connects to a second outlet (not shown) positioned at a higher level than standpipe 38. This second outlet provides for overflow directly to return pipe 20, in the event that standpipe 38 or tube 39 should become clogged. Also positioned within clarifier tank 36 is a level switch 121, which may be attached to the inside of the tank by any suitable means. Level switch 121 is part of the electrical control system as explained hereinafter, and functions to provide an indication of the level of fluid in the clarifier tank.

The clarified supernatant from settling tank 36 is conveyed through tube 39 to filter 42 which may be an activated charcoal filter. From filter 42, the filtered water is conveyed by tube 43 to a sterilizer/heat exchanger unit 44. The sterilized final effluent is taken at outlet port 45.

Figure 3:
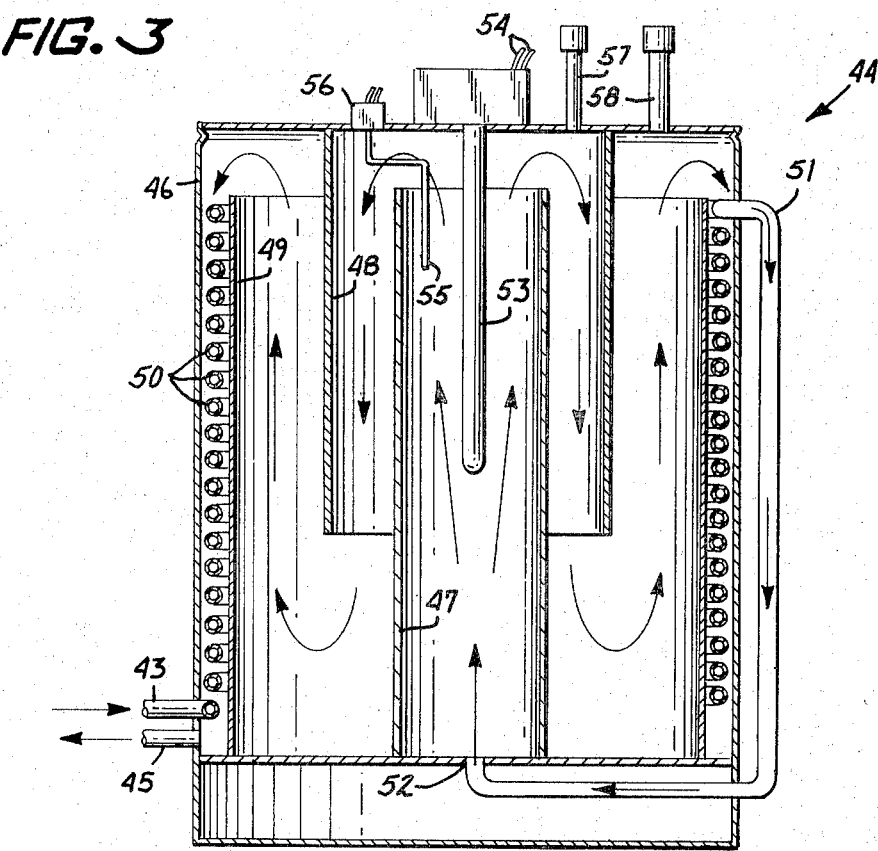
FIG. 3 is a cross-section of a sterilizer-heat exchanger for use in conjunction with the present invention.

The sterilizer/heat exchanger unit according to the preferred embodiment of the present invention is shown in cross-sectional diagrammatic view in FIG. 3. In FIG. 3, sterilizer/heat exchange unit 44 generally comprises a tank 46 having concentric cylindrical baffles 47, 48 and 49. Disposed within the relatively narrow cylindrical area between baffle 49 and the outside wall of tank 46, is a helical coil heat exchanger tube 50. Coil 50 receives its input at the lower end from tube 43, and has its output at the upper end, where tube 51 connects to convey water therefrom to an inlet 52 at the bottom of a central portion of the sterilizer tank, while baffle 48 connects to the top. Attached to the top of tank 46 and extending into the center thereof is a heating element 53 which is supplied with electric current by leads 54. Also positioned within the central portion of the sterilizer tank is a probe 55 which connects to a temperature limit switch 56. A pair of vents 57 and 58 vent portions of the sterilizer tank inside and outside of baffle 48, respectively.

As filtered influent from tube 43 travels helically upward in coil 50, it absorbs heat from the sterilized effluent passing over baffle 49 and down and out outlet 45. The heated effluent is then conveyed by tube 51 to the center region of the sterilizer tank where it is heated by heating element 53. From there the water travels in a path indicated by the arrows.

Referring again to FIG. 2, an ambient heater assembly 65 is provided within the waste water treatment unit. In the preferred embodiment, heater 65 is a 1,200 watt fan type wall heater with integral adjustable thermostat control. Heater 65 is mounted to frame 24 by any suitable means, and is connected to receive electrical power from the control system, as explained hereinafter. The purpose of the ambient heater is to provide sufficient heat in the lower portion of the waste water treatment unit to prevent freezing of lines carrying influent or effluent during the winter months. During the period from spring to fall, the ambient heater would be turned off.

An electrical control cabinet 68 is positioned at a convenient location within the unit and attached by suitable means to frame 24. Control cabinet 68 contains the various electrical components of the control system which are described hereinafter.

Figure 4:
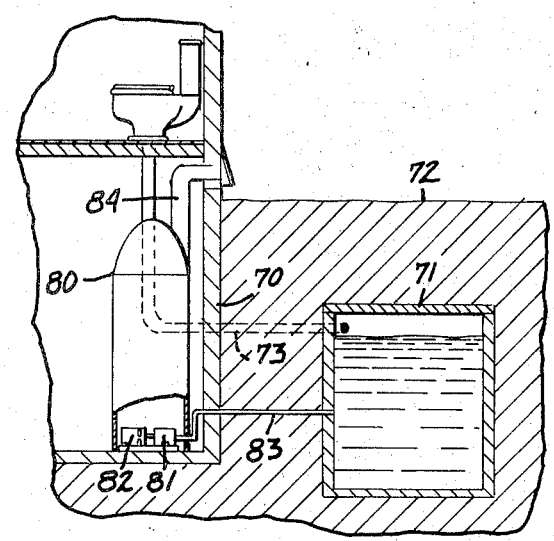
FIG. 4 is a diagram showing an alternate embodiment of the present invention.

FIG. 4 shows an alternate embodiment of the home waste water treatment system according to the present invention. In FIG. 4, the treatment unit is adapted to be installed in the basement of a home, rather than outside the home on top of the septic tank as in FIG. 1. Reference numeral 70 designates the basement wall of a house, and reference numeral 71 designates a conventional septic tank buried below the surface of the ground 72. A sewer pipe 73 conveys waste water from the several sources in the house to the septic tank.

The treatment unit 80 is positioned inside the basement of the house. Treatment unit 80 is similar to the treatment unit 10 of FIGS. 1 and 2, and includes a biological oxidation unit, clarifier tank, filter, and heat exchanger/sterilizer as has previously been described. However, for purposes of installation in the basement of a house, the treatment unit 80 differs from treatment unit 10 of FIGS. 1 and 2 in the following respects: a fluid pump is used in place of the bucket pump, and the housing is sealed and vented through duct work to the outside of the house.

Instead of the bucket pump assembly 16 of FIGS. 1 and 2, the embodiment of FIG. 4 uses a fluid pump 81, driven by an electric motor 82, which draws waste water from septic tank 71 through a conduit 83, and then delivers it to a dis-type biological oxidation unit similar to the one previously described. Instead of venting the biological oxidation unit to the atmosphere through louvers 14 shown in FIG. 1, the embodiment of FIG. 4 uses a closed sealed housing. A duct 84 connects between a fitting on the outside of the house to the top of the housing of treatment unit 80, to allow a fresh supply of oxygen to come into the biological oxidation unit. The treatment unit is preferably vented to the existing vent for the plumbing system in the house (not shown). This arrangement provides fresh oxygen for the biological treatment unit, but prevents unwanted odors from escaping into the house.

Figure 5:
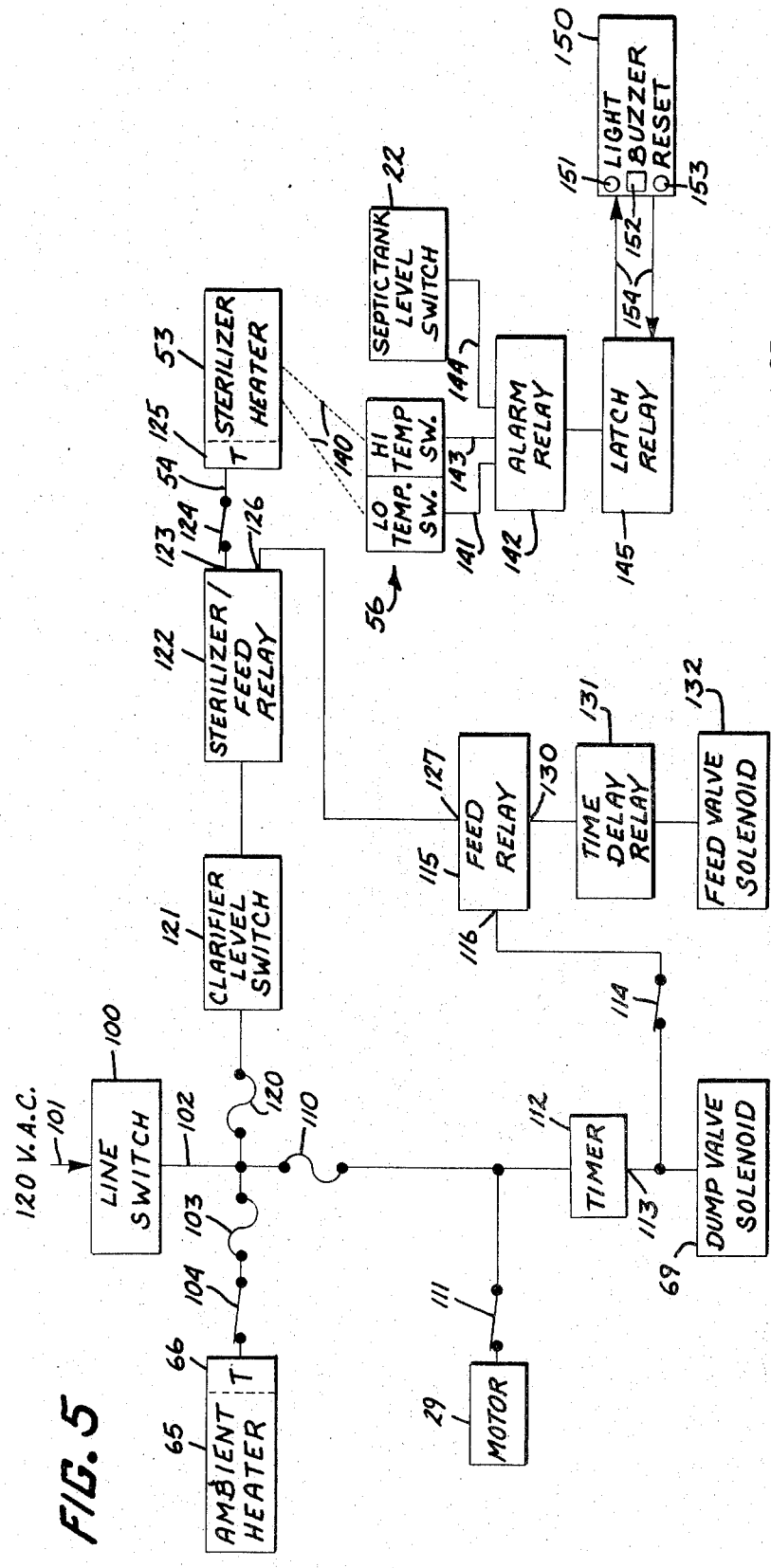
FIG. 5 is a diagram of the control system for the preferred embodiment of the invention.

FIG. 5 shows a diagram of the electrical control system of the home waste water treatment unit of the present invention. A line switch 100 is connected by lead 101 to a source of 120 volt AC power (not shown). The other side of line switch 100 connects to a lead 102 which branches to distribute power to the various circuits of the control system. One branch of lead 102 connects through a fuse 103, and a switch 104 to ambient heater 65. Ambient heater 65 contains an integral series connected thermostat 66. Another branch of lead 102 connects through a fuse 110, and a switch 111 to motor 29. A timer 112 is also connected to receive power through fuse 110. An output lead 113 connects from timer 112 to the dump valve solenoid 69, and also through switch 114 to feed control relay 115. A third branch of lead 102 connects through fuse 120 to the clarifier level switch 121. The output of level switch 121 is connected to sterilizer/feed relay 122. A first output 123 of relay 122 connects through switch 124 and leads 54 to the sterilizer heater 53. A series connected integral thermostat 125 is included within sterilizer heater 53. A second output 126 of relay 122 is connected to input 127 of feed control relay 115. Output 130 of feed control relay 115 is connected to a time delay relay 131, which in turn is connected to the feed valve solenoid 132.

Switches 104, 111, 114 and 124 may preferably be located on a subpanel within electrical control cabinet 68 of FIG. 2. Switch 104 controls the power to ambient heater 65, and may be switched off for summer use. Switch 111 which is normally closed, controls the power to motor 29, and may be opened if needed for maintenance or adjustments to the unit. Switch 114 is closed for operation of the automatic feed system, and is opened to turn off the automatic feed system. Switch 124 normally is closed, but may be turned off for servicing or adjustment of the sterilizer heater.

A malfunction warning portion of the control system contains the following elements. Numeral 56 refers to the temperature limit switch which is connected to probe 55 placed in the sterilizer tank, as shown in FIG. 3. In FIG. 5, dotted lines 140 indicate the temperature responsive relationship between heater 53 and switch 56, via the heat of the water in the sterilizer tank. Temperature limit switch 56 has a low temperature switch section which connects via lead 141 to the alarm relay 142, and a high temperature section which connects via lead 143 to the alarm relay. The septic tank level switch 22 is also connected to alarm relay 142, by lead 144. Alarm relay 142 is connected to latch relay 145.

A remote alarm panel 150 is provided for indicating the presence of a malfunction condition. All of the components shown in FIG. 5 except remote alarm panel 150 are preferably mounted in control box 68 mounted to the home waste water treatment unit as indicated in FIG. 2. Remote alarm panel 150 which contains a warning light 151, a buzzer 152, and a reset button 153 is mounted remote from the waste treatment unit, and connected thereto by leads 154. For example, where the home waste water treatment unit is mounted outside the house over the septic tank, as indicated in FIG. 1, remote alarm panel 150 would be mounted in the basement of the house.

If either an excessively high or excessively low temperature should develop in the sterilizer tank, temperature limit switch 56 will cause alarm relay 142 to energize. Likewise, an excessively high level in the septic tank will cause switch 22 to energize the alarm relay. In any event, once the alarm relay is energized, the warning light 151 and buzzer 152 of the remote alarm panel are energized by action of latch relay 145. Both the warning light 151 and buzzer 152 will remain on until the condition initiating energization of the alarm relay is corrected. Alternatively, reset button 153 can be pushed by the home owner, thereby actuating a momentary contact switch which sends a signal to latch relay 145 via leads 151. Latch relay 145 then de-energizes buzzer 152, but warning light 151 remains on until the fault is corrected.

In operation, waste water from the home sewage system is piped to the primary holding tank where it undergoes anaerobic decomposition. In the primary holding, or septic tank, the heavier material settles to the bottom of the tank and some lighter materials float at the surface. The bucket pump 16 of FIG. 1, or the fluid pump 81 of FIG. 4 convey primary settled sewage from near the center of the primary holding tank to the biological oxidation tank 26.

Figure 6:
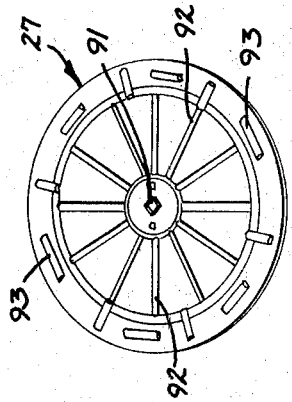
FIG. 6 is a detail of a disc for use in systems according to the present invention.

FIG. 6 shows a detailed view of one of the discs 27 for use in the waste water treatment unit of FIG. 2. Discs 27 are preferably molded from a plastic material which is impervious to the chemicals and processes contained within tank 26. Disc 27 has a central aperture 91 from mounting on shaft 28. In the preferred embodiment, aperture 91 is square, for engaging a correspondingly sectioned portion of shaft 28. Other arrangements could be used for keying the disc to the shaft to prevent slippage. A plurality of raised spokes 92 are molded into disc 27 to provide rigidity therefor. Also, a plurality of raised spacers 93 are molded into the circumferential edge of the disc. Alternate spacers are oriented radially and tangentially, respectively, and serve to space discs 27 from one another when assembled together on shaft 28 as shown in FIG. 2. (For clarity, spacers 93 and spokes 92 shown in FIG. 6 have been omitted from the drawing of FIG. 2). Spacers 93 thus serve to prevent adjacent discs from bending into contact with one another, which would reduce the effective surface area.

For effective treatment, the surface area of the discs should be as large as possible. However, in order to keep the unit to a reasonable overall size, efficient space utilization is required. It has been found that a disc diameter of from about 1 to 3 feet, and disc spacing of from one-fourth to three-fourths inch, combined with a rotational speed of about 5 to 15 revolutions per minute gives the most efficient results. If the discs are spaced closer, bacterial slimes on adjacent discs grow together and reduce the effective area. If the discs are too small or are spaced too far apart, too much frame size is required to provide sufficient disc area. If the discs are too large, the size of the unit becomes unwieldy for home treatment units.

Baffle means are provided for effectively dividing tank 26 into a plurality of sections, so as to provide a number of stages of biological oxidation. In one successful embodiment according to the present invention, tank 26 was divided by baffles to provide four stages of biological oxidation, resulting in improved efficiency. For purposes of clarity, FIG. 2 shows a single baffle 61 which effectively divides tank 26 into two sections, it being understood that additional baffles to provide additional stages of treatment could be provided in the same manner. In each section, discs 27 provide a favorable surface for the growth of bacterial slime. The slimes are alternatively submerged in the waste water to receive nutrients, then exposed to the air to receive oxygen as the discs rotate. Under such favorable conditions, the bacteria grow very rapidly and provide a minimum of 80 percent aerobic treatment to the waste water, also eliminating substantially all of the biochemical oxygen demand. As the slimes grow, the bacteria nearest the surface die and periodically clumps of the slime slough off where they are conveyed together with the clarified waste water to the clarifier tank 36 where the slime clumps and any other solid materials which may be present settle to the tapered bottom of the tank. The clarified supernatant is skimmed off the top of the liquid and passed through filter 42 to the sterilizer unit 44. In the preferred embodiment, filter 42 is an activated charcoal filter which helps remove further impurities from the clarified supernatant. In other embodiments, other common types of filters may be used. In still other embodiments, where a high degree of clarity of water is not required, the filter may be omitted.

In one preferred embodiment, sterilizer/heat exchanger unit 44 is designed and sized so that the normal flow rate of fluid, which is determined by the capacity of bucket pump 16 or fluid pump 81, results in ten minute exposure to the sterilizing temperature of 160° between the time that fluid enters and finally departs from the unit. Of course, the setting of thermostat 125 of the sterilizer heater could be adjusted to other temperatures, depending upon the power consummation and the degree of sterilization required for a particular installation.

Dump valve solenoid 69 is periodically energized, under the control of timer 112, thereby allowing the accumulated sludge to return to return pipe 20 to the primary holding tank. Normally, no output voltage appears at output 113 of timer 112 (FIG. 5), during the timing cycle of the timer. In the preferred embodiment, timer 112 is selected to provide an output at 113 once every 24 hours, preferably late at night when demands on the system are at a minimum, at which time dump valve solenoid 69 is then energized. At the same time, voltage is applied to input 116 of feed control relay 115, for possible actuation of the feed valve solenoid, depending upon the state of the sterilizer/feed relay 122. Timer 112 is designed so that the output remains on for about 30 seconds, to allow sufficient time for emptying of the clarifier tank.

The sterilizer/feed relay 122 operates under the control of the clarifier level switch 121. During normal operation, the level of fluid in the clarifier tank is at a high level, and clarified supernatant is being drawn off the top and into the sterilizer. Under these conditions, clarifier level switch 121 causes relay 122 to operate in a first state, in which power is applied through output 123 to energize sterilizer heater 53. During periods of nonuse of the sewer system in the house such as when the home owner is on vacation, the liquid level inside the primary holding tank will gradually be lowered as sewage is processed by the system. When the level becomes low enough, the bucket pump will no longer bring the material into the biological oxidation tank, thus terminating flow into the clarifier tank. After the next succeeding activation of dump valve solenoid 69, the clarifier tank will be empty and will fail to refill. At this time, clarifier level switch 121 will cause relay 122 to switch to a second state in which power is cut off from sterilizer heater 53 and instead is applied through output 126 to feed control relay 115.

At the end of the next cycle of timer 112, the voltage applied at output 113 of the timer is applied to terminal 116 of the feed control relay. With voltages applied to both terminals 116 and 127, the feed control relay energizes time delay relay 131, which in turn actuates the feed valve solenoid 132. Time delay relay 131 is selected for holding open the feed valve for a predetermined time interval, thereby allowing nutrient solution to pass from container 133 through feed tube 134 into the biological oxidation tank 26 (FIG. 2). This automatic feeding sequence insures that the bacteria will remain alive in the biological oxidation tank during such period of nonuse, so that the system will be ready for immediate operation when the period of nonuse is over and material is once again conveyed to the biological oxidation tank. When the clarifier tank fills again, the automatic feeding system is switched off and the sterilizer heater is energized. During an extended period of nonuse, such as the winter season, in the case of a summer home, line switch 100 would be turned off, and tanks would be drained to prevent freezing.

Thus, the final effluent has been highly treated by the steps of (1) primary settling and anaerobic decomposition, (2) biological oxidation, (3) secondary settling, (4) filtering, and (5) sterilization. The final effluent may be piped to an underground leach field, without any danger of water supply contamination or oxygen depletion. Alternatively, the final effluent may be piped for use in watering the lawn, or it may be recycled for use in flushing toilets, or in other non-hygenic uses.

I claim:

1. A home waste water treatment system, comprising:

a. a primary holding tank for receiving raw sewage, and for holding the sewage while it undergoes anaerobic decomposition;
b. a multiple stage biological oxidation tank having a plurality of successive compartments separated by baffles, and including a plurality of discs spaced from one another and mounted on a shaft for rotation about a generally horizontal axis so that the surfaces of said discs are alternately submerged within said compartments and exposed to the atmosphere;
c. means for pumping anaerobically treated sewage from said primary holding tank to a first compartment of said multiple compartment biological oxidation tank, thereby transferring partially aerobically treated material from the first compartment to successive compartments;
d. a clarifier tank having a tapered lower portion;
e. means for conveying aerobically treated material from the final compartment of the biological oxidation tank to the clarifier tank;
f. means for returning accumulated sludge from the bottom of the clarifier tank to the primary holding tank;
g. a sterilizer operable to destroy bacteria in fluids applied thereto by heating the fluid, said sterilizer having an inlet and an outlet;
h. a heat exchanger connected to said inlet and said outlet of said sterilizer, said heat exchanger operable to transfer heat from fluid at said outlet to fluid at said inlet; and
i. means for collecting the supernatant from said clarifier tank and for conveying said supernatant to said heat exchanger and to the inlet of said sterilizer.

2. Apparatus according to claim 1 further including means for periodically supplying nutrients to said biological oxidation tank, when the supplying of anaerobically treated sewage to said biological oxidation tank is suspended.

3. Apparatus according to claim 1 wherein said pumping means comprises a bucket pump extending downwardly into said primary holding tank, for lifting the anaerobically treated sewage therefrom and emptying it into said biological oxidation tank.

4. Apparatus according to claim 3 wherein said bucket pump comprises a chain loop having a plurality of buckets attached thereto, a sprocket for drivably engaging said chain, and means for mounting said sprocket for rotation with the shaft on which said discs are mounted.

5. A home waste water treatment unit, comprising:
a. a septic tank for receiving sewage to be treated and for holding the sewage while it undergoes anaerobic decomposition;
b. a frame;
c. a biological oxidation tank attached to said frame near the upper portion thereof, said tank having a plurality of compartments separated by baffle means;
d. a disc assembly rotatably mounted in said biological oxidation tank, said disc assembly comprising a plurality of discs spaced from one another and mounted on a shaft for rotation within said compartments about a generally horizontal axis;
e. means for mounting said shaft in said biological oxidation tank near the normal liquid level therein, so that the surfaces of said discs are alternately submerged and exposed to air;
f. means for pumping anaerobically treated sewage from the septic tank and for conveying it to a compartment at one end of said biological oxidation tank, thereby displacing partially treated sewage to successive compartments;
g. a clarifier tank attached to said frame generally beneath said biological oxidation tank, said clarifier tank having a tapered lower portion;
h. means for conveying aerobically treated sewage from the top of the liquid level in the final compartment of said boilogical oxidation tank to said clarifier tank for settling of sludge to form a clarified supernatant;
i. means including a dump valve for periodically returning accumulated sludge from the bottom of the clarifier tank to the septic tank; and
j. means for collecting the supernatant from the clarifier tank.

6. Apparatus according to claim 5 wherein said discs have a plurality of stiffening spokes molded therein, and a plurality of raised spacers molded therein along the circumference thereof, said raised spacers for maintaining the spacing between the edges of said plurality of discs, thereby maintaining the effective surface area of the discs.

7. Apparatus according to claim 5 further including timing means operatively connected to said dump valve for activation thereof at predetermined time intervals.

8. Apparatus according to claim 5 further including a sterilizer connected to receive the clarified supernatant and temperature sensing means connected to said sterilizer and alarm means connected to said temperature sensing means for providing an alarm signal if the temperature within said sterilizer departs from a predetermined range.

9. Apparatus according to claim 8 further including an artificial feed system comprising means for supplying nutrients for the bacteria, means for introducing said nutrients into said biological oxidation tank, a feed control valve connected to said supply means and said introducing means, and feed control means connected to said feed control valve and said level sensing means, said feed control means for periodically opening said feed control valve when the liquid level in said clarifier tank is low.

10. Apparatus according to claim 5 further including a fluid level probe disposed within said septic tank for sensing the fluid level therein, and alarm means connected to said fluid level probe for providing an alarm signal if the fluid level in said septic tank exceeds a predetermined level.

11. Apparatus according to claim 5 further including level sensing means associated with said clarifier tank for producing a control signal indicative of the liquid level therein, and control means connected to receive said control signals and further connected to said heater of said sterilizer for controlling the operation thereof in response to the liquid level in said clarifier tank.

12. A waste water treatment system, comprising:
a. a septic tank for receiving waste water to be treated and for holding it while it undergoes anaerobic decomposition;

b. a plurality of biological oxidation stages, each including a container, a plurality of discs spaced from one another and arranged for rotation about a generally horizontal axis with a portion of the dics extending above the normal liquid level in the container;

c. means for pumping anaerobically treated waste water from the septic tank to the first biological oxidation stage for partial oxidation;

d. said biological oxidation stages including means for conveying partially oxidized material to successive stages;

e. a clarifier tank having a tapered lower portion, said clarifier tank for separation by settlement of sludge to form a clarified supernatant;

f. means for conveying aerobically treated material from the last biological oxidation stage to the clarifier tank; and g. means for removing clarified supernatant from the clarifier tank.

13. Apparatus according to claim 12 wherein the plurality of biological oxidation stages includes a tank divided into a plurality of compartments by baffle means, and wherein overflow areas above the baffle means comprise the means for conveying partially oxidized material to successive stages.

14. Apparatus according to claim 12 further including filter means connected to receive the clarified supernatant, for filtering the supernatant.

15. Apparatus according to claim 12 further including sterilizer means connected to receive the clarified supernatant, for killing any remaining bacteria therein.

16. The apparatus according to claim 12 further including a motor connected for rotation of said discs at a speed of from 5 revolutions per minute to 15 revolutions per minute.

17. The apparatus according to claim 12 wherein said discs have a diameter of from 1 to 3 feet, and are spaced from one another by a distance of from one-fourth to three-fourths inches.

18. The apparatus according to claim 12 wherein said means for pumping comprises a bucket pump extending into said septic tank for transferring waste water from said septic tank to said first biological oxidation stage.

19. The apparatus according to claim 12 further including means for supplying nutrients to said biological oxidation tank during periods of nonuse of the system, so that bacteria therein are kept alive for immediate use upon resumption of use of the system.

* * * * *